United States Patent
Liu et al.

(10) Patent No.: US 10,959,183 B2
(45) Date of Patent: *Mar. 23, 2021

(54) UPLINK POWER CONTROL METHOD AND APPARATUS

(71) Applicant: Huawei Technologies Co., Ltd., Shenzhen (CN)

(72) Inventors: Jianqin Liu, Beijing (CN); Bingyu Qu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/870,620

(22) Filed: May 8, 2020

(65) Prior Publication Data

US 2020/0275381 A1    Aug. 27, 2020

Related U.S. Application Data

(63) Continuation of application No. 16/370,186, filed on Mar. 29, 2019, now Pat. No. 10,681,646, which is a continuation of application No. PCT/CN2017/103577, filed on Sep. 27, 2017.

(30) Foreign Application Priority Data

Sep. 30, 2016 (CN) .......................... 201610878908.1
Mar. 10, 2017 (CN) .......................... 201710142272.9

(51) Int. Cl.
*H04W 52/14*    (2009.01)
*H04W 52/24*    (2009.01)
*H04W 52/36*    (2009.01)
*H04W 52/32*    (2009.01)
(Continued)

(52) U.S. Cl.
CPC ............ *H04W 52/146* (2013.01); *H04B 7/06* (2013.01); *H04W 52/246* (2013.01);
(Continued)

(58) Field of Classification Search
CPC ... H04W 52/146; H04W 52/36; H04W 52/42; H04W 52/246; H04W 52/58;
(Continued)

(56) References Cited

U.S. PATENT DOCUMENTS 9,794,887 B2    10/2017 Ouchi et al.
10,681,646 B2 *  6/2020 Liu .................... H04W 52/146
(Continued)

FOREIGN PATENT DOCUMENTS

CN    101523930        9/2009
CN    103391607 A     11/2013
(Continued)

OTHER PUBLICATIONS

"Uplink Power Control," 3GPP TSG RAN WG1 Meeting #86, Gothenburg, Sweden, R1-167226, pp. 1-4, 3rd Generation Partnership Project,Valbonne, France (Aug. 22-26, 2016).
(Continued)

*Primary Examiner* — Eugene Yun
(74) *Attorney, Agent, or Firm* — Leydig, Voit & Mayer, Ltd.

(57) ABSTRACT

This application provides an uplink power control method and apparatus. A network side device sends a plurality of pieces of configuration information of an RACH to UE, and indicates, by using a scheduling message of the RACH, identifier information of the configuration information of the RACH used by the UE. The UE calculates a transmit power of the RACH based on the configuration information that is of the RACH and that is corresponding to the identifier information, and sends a random access preamble to the network side device based on the transmit power of the RACH.

18 Claims, 6 Drawing Sheets

(51) Int. Cl.
  *H04B 7/06* (2006.01)
  *H04W 52/42* (2009.01)
  *H04W 52/58* (2009.01)
  *H04W 52/50* (2009.01)

(52) U.S. Cl.
  CPC ......... *H04W 52/325* (2013.01); *H04W 52/36* (2013.01); *H04W 52/42* (2013.01); *H04W 52/58* (2013.01); *H04B 7/0617* (2013.01); *H04W 52/50* (2013.01)

(58) Field of Classification Search
  CPC ...... H04W 52/325; H04W 52/50; H04B 7/06; H04B 7/0617
  USPC ....................................................... 455/522
  See application file for complete search history.

(56) References Cited

U.S. PATENT DOCUMENTS

| | | |
|---|---|---|
| 2010/0309877 A1 | 12/2010 | Damnjanovic et al. |
| 2011/0081939 A1 | 4/2011 | Damnjanovic et al. |
| 2011/0096815 A1 | 4/2011 | Shin et al. |
| 2012/0077484 A1 | 3/2012 | Ji |
| 2016/0286495 A1 | 9/2016 | Dinan |
| 2018/0014257 A1 | 1/2018 | Ouchi et al. |

FOREIGN PATENT DOCUMENTS

| | | |
|---|---|---|
| CN | 103843423 | 6/2014 |
| JP | 2013507062 A | 2/2013 |
| KR | 20120086300 A | 8/2012 |
| WO | 2011041555 A2 | 4/2011 |

OTHER PUBLICATIONS

"Power Control for MIMO," 3GPP TSG-RAN WG1 #86, Gothenburg, Sweden, R1-167292, pp. 1-4, 3rd Generation Partnership Project, Valbonne, France (Aug. 22-26, 2016).

KR/20197011965, Notice of Preliminary Rejection, dated Jan. 13, 2020.

JP/2019-517845, Notice of Allowance, dated Jan. 5, 2021.

U.S. Appl. No. 16/370,186, filed Mar. 29, 2019.

* cited by examiner

First type of preamble format

| CP | Sequence | Sequence | Sequence | GP |

Second type of preamble format

Subtype 1

| CP | Sequence 1 | CP | Sequence 2 | CP | Sequence 3 | GP |

Subtype 2

| CP | Sequence 1 | CP | Sequence 1 | CP | Sequence 2 | CP | Sequence 2 | CP | Sequence 3 | GP |

FIG. 3

UPLINK POWER CONTROL METHOD AND APPARATUS

CROSS-REFERENCE TO RELATED APPLICATIONS

This application is a continuation of U.S. patent application Ser. No. 16/370,186, filed on Mar. 29, 2019, which is a continuation of International Application No. PCT/CN2017/103577, filed on Sep. 27, 2017, which claims priority to Chinese Patent Application No. 201610878908.1, filed on Sep. 30, 2016 and Chinese Patent Application No. 201710142272.9, filed on Mar. 10, 2017. All of the aforementioned patent applications are hereby incorporated by reference in their entireties.

TECHNICAL FIELD

A random access channel (RACH) uses an open-loop power control manner for a power setting. When receiving a random access preamble sent by UE by using the RACH, a base station may use a beamforming technology. In addition, the base station may use different receive beams to receive one or more preambles sent by a user.

Because different receive beams are corresponding to different beamforming gains, the different receive beams may be corresponding to different target receive powers of the base station and different preamble formats used by the user. When the UE sends the preamble, the base station may perform adaptive switching on the receive beams based on quality of receiving the preamble, for example, the base station is switched from a receive beam 1 to a receive beam 2. For example, when reciprocity of a transmit beam and the receive beam of the base station does not exist, when receiving the preamble sent by the UE, the base station needs to poll a plurality of candidate receive beams, to select an optimal receive beam to receive the preamble. In this case, the different receive beams may be corresponding to different power control parameters of the preamble.

However, an existing RACH power control mechanism is usually based on fixed omnidirectional antenna transmission or fixed receive beam transmission. For a scenario in which a receive beam rapidly changes, if the existing power control mechanism is still used, power control of the RACH is not precise enough, thereby affecting an access success rate of an uplink RACH.

BACKGROUND

A random access channel (RACH) uses an open-loop power control manner for a power setting. When receiving a random access preamble sent by UE by using the RACH, a base station may use a beamforming technology. In addition, the base station may use different receive beams to receive one or more preambles sent by a user.

Because different receive beams are corresponding to different beamforming gains, the different receive beams may be corresponding to different target receive powers of the base station and different preamble formats used by the user. When the UE sends the preamble, the base station may perform adaptive switching on the receive beams based on quality of receiving the preamble, for example, the base station is switched from a receive beam 1 to a receive beam 2. For example, when reciprocity of a transmit beam and the receive beam of the base station does not exist, when receiving the preamble sent by the UE, the base station needs to poll a plurality of candidate receive beams, to select an optimal receive beam to receive the preamble. In this case, the different receive beams may be corresponding to different power control parameters of the preamble.

However, an existing RACH power control mechanism is usually based on fixed omnidirectional antenna transmission or fixed receive beam transmission. For a scenario in which a receive beam rapidly changes, if the existing power control mechanism is still used, power control of the RACH is not precise enough, thereby affecting an access success rate of an uplink RACH.

SUMMARY

This application provides an uplink power control method and apparatus, so that a network side device can dynamically adjust a transmit power of an RACH based on changes in beamforming gains of different receive beams or transmit beams, to precisely control the transmit power of the RACH and improve an access success rate of an uplink RACH.

A first aspect of this application provides an uplink power control method, including: receiving, by UE, a plurality of pieces of configuration information of an RACH that are sent by a network side device; receiving a scheduling message that is of the RACH and that is sent by the network side device, where the scheduling message of the RACH includes identifier information of one of the plurality of pieces of configuration information of the RACH; determining, by the UE from the plurality of pieces of configuration information of the RACH based on the identifier information included in the scheduling message of the RACH, the configuration information that is of the RACH and that is corresponding to the identifier information; and calculating a transmit power of the RACH based on the determined configuration information of the RACH, and sending a random access preamble to the network side device based on the transmit power of the RACH. Each piece of configuration information of the RACH is corresponding to a receive beam of the network side device or a transmit beam of the UE, so that the network side device can dynamically adjust the transmit power of the RACH based on changes in beamforming gains of different receive beams or transmit beams, to precisely control the transmit power of the RACH and improve an access success rate of an uplink RACH, thereby implementing maximization of data transmission power efficiency, power utilization and data transmission performance.

A second aspect of this application provides an uplink power control method, including: sending, by a network side device, a plurality of pieces of configuration information of a random access channel RACH to UE; and sending a scheduling message of the RACH to the UE, where the scheduling message of the RACH includes identifier information of one of the plurality of pieces of configuration information of the RACH. In this way, the UE determines, from the plurality of pieces of configuration information of the RACH based on the identifier information included in the scheduling message of the RACH, the configuration information that is of the RACH and that is corresponding to the identifier information, and calculates a transmit power of the RACH based on the determined configuration information of the RACH.

A third aspect of this application provides UE, including:
a receiving module, configured to receive a plurality of pieces of configuration information of a random access channel RACH that are sent by a network side device, where the receiving module is further configured to receive a scheduling message that is of the RACH and that is sent by the network side device, where the scheduling message of the RACH includes identifier information of one of the plurality of pieces of configuration information of the RACH;

a determining module, configured to determine, from the plurality of pieces of configuration information of the RACH based on the identifier information included in the scheduling message of the RACH, the configuration information that is of the RACH and that is corresponding to the identifier information;

a calculation module, configured to calculate a transmit power of the RACH based on the determined configuration information of the RACH; and a sending module, configured to send a random access preamble to the network side device based on the transmit power of the RACH.

A fourth aspect of this application provides a network side device, including:

a sending module, configured to send a plurality of pieces of configuration information of a random access channel RACH to UE, where the sending module is further configured to send a scheduling message of the RACH to the UE, where the scheduling message of the RACH includes identifier information of one of the plurality of pieces of configuration information of the RACH.

In the first aspect to the fourth aspect of this application, each piece of configuration information of the RACH includes one or more pieces of the following information: a power offset value of a receive beam used by the network side device, format information of a random access preamble, a receive power of the network side device, a format correction value of the preamble, a quantity of times of sending the preamble, and power ramping step information when the preamble is retransmitted.

In the first aspect to the fourth aspect of this application, each piece of configuration information of the RACH is corresponding to a receive beam of the network side device. Alternatively, each piece of configuration information of the RACH is corresponding to a transmit beam of the UE. In this way, the network side device can dynamically adjust the transmit power of the RACH based on changes in beamforming gains of different transmit beams of the UE or changes in beamforming gains of different receive beams, thereby implementing maximization of data transmission power efficiency and data transmission performance.

In the first aspect to the fourth aspect of this application, the plurality of pieces of configuration information of the RACH are sent by the network side device to the UE by using a broadcast channel or system information.

In the first aspect to the fourth aspect of this application, the scheduling message of the RACH is indicated by the network side device to the UE by using a physical layer control command.

In the first aspect to the fourth aspect of this application, the preamble includes S cyclic prefixes and T sequences, and the format information of the preamble includes a quantity S of cyclic prefixes and/or a quantity T of sequences, where S and T are integers greater than or equal to 1.

In the first aspect to the fourth aspect of this application, the quantity S of cyclic prefixes and the quantity T of sequences meet the following: T is an integer multiple of S.

In the first aspect to the fourth aspect of this application, when a transmit beam of the UE is switched, a quantity of power ramping times that is included in the configuration information of the RACH remains unchanged.

A fifth aspect of this application provides UE. The UE includes a processor, a memory, and a communications interface. The memory is configured to store an instruction, the communications interface is configured to communicate with another device, and the processor is configured to execute the instruction stored in the memory, so that the UE performs the method provided in the first aspect of this application.

A sixth aspect of this application provides a network side device. The network side device includes a processor, a memory, and a communications interface. The memory is configured to store an instruction, the communications interface is configured to communicate with another device, and the processor is configured to execute the instruction stored in the memory, so that the network side device performs the method provided in the second aspect of this application.

A seventh aspect of this application provides an uplink power control method, including: receiving, by UE, power offset information configured by a network side device, where the power offset information is used to adjust a transmit power of the UE; and determining, by the UE, a transmit power of an uplink channel or an uplink signal based on the power offset information. The network side device configures the power offset information for the UE. The power offset information is used to adjust the transmit power of the UE. The power offset information is determined by the network side device based on a change in a beamforming gain of the UE or the network side device. The UE receives the power offset information sent by the network device, and determines the transmit power of the uplink channel or the uplink signal based on the power offset information. Because a power offset caused by the change in the beamforming gain is considered when the transmit power of the uplink channel or the uplink channel is determined, an uplink transmit power obtained through calculation is more accurate.

Optionally, the receiving, by UE, power offset information configured by a network side device includes:

receiving, by the UE, N power offset terms sent by the network side device, where N is a positive integer greater than or equal to 1; and receiving, by the UE, an index of any one of the N power offset terms sent by the network side device, where the determining, by the UE, a transmit power of an uplink channel or an uplink signal based on the power offset information includes:

determining, by the UE from the N power offset terms based on the received index of the power offset term, a power offset term corresponding to the index; and determining, by the UE, the transmit power of the uplink channel or the uplink signal based on the determined power offset term.

Optionally, the N power offset terms are sent by the network side device to the UE by using higher layer signaling; and the index that is of the power offset term and that is received by the UE is sent by the network side device to the UE by using downlink control signaling.

Correspondingly, the receiving, by the UE, an index of any one of the N power offset terms sent by the network side device includes:

receiving, by the UE, a TPC command (transmit power control command) field sent by the network side device, where the TPC command field is corresponding to an index of the power offset term, or the TPC command field is corresponding to an index of the power offset term and a TPC command; and determining, by the UE from the N power offset terms based on the TPC command field, a power offset term corresponding to the TPC command field.

Optionally, a format of the downlink control signaling is any one of downlink control information DCI formats used for uplink data transmission.

Optionally, the receiving, by UE, power offset information configured by a network side device includes:

receiving, by the UE, a power offset term sent by the network side device, where the determining, by the UE, a transmit power of an uplink channel or an uplink signal based on the power offset information includes:

determining, by the UE, the transmit power of the uplink channel or the uplink signal based on the received power offset term.

Optionally, the power offset term received by the UE is sent by the network side device to the UE by using higher layer signaling.

Optionally, the uplink channel is an uplink traffic channel or an uplink control channel, and the uplink signal is an uplink reference signal.

An eighth aspect of this application provides an uplink power control method, including:

configuring, by a network side device, power offset information for UE, where the power offset information is used to adjust a transmit power of the UE.

Optionally, the configuring, by a network side device, power offset information for UE includes:

sending, by the network side device, N power offset terms to the UE, where N is a positive integer greater than or equal to 1; and sending, by the network side device, an index of any one of the N power offset terms to the UE.

Optionally, the network side device sends the N power offset terms to the UE by using higher layer signaling; and the network side device sends an index of the power offset term to the UE by using downlink control signaling.

Correspondingly, the sending, by the network side device, an index of any one of the N power offset terms to the UE includes:

sending, by the network side device, a TPC command field to the UE, where the TPC command field is corresponding to an index of the power offset term, or a TPC command field is corresponding to the power offset term and a TPC command.

Optionally, a format of the downlink control signaling is any one of downlink control information DCI formats used for uplink data transmission.

Optionally, the configuring, by a network side device, power offset information for user equipment UE includes:

sending, by the network side device, a power offset term to the UE.

Optionally, the network side device sends the power offset term to the UE by using higher layer signaling.

A ninth aspect of this application provides UE, including a receiving module and a determining module. The receiving module is configured to receive power offset information configured by a network side device, where the power offset information is used to adjust a transmit power of the UE. The determining module is configured to determine a transmit power of an uplink channel or an uplink signal based on the power offset information.

Optionally, the receiving module is specifically configured to: receive N power offset terms sent by the network side device, where N is a positive integer greater than or equal to 1; and receive an index of any one of the N power offset terms sent by the network side device. Correspondingly, the determining module is specifically configured to: determine, from the N power offset terms based on the received index of the power offset term, a power offset term corresponding to the index; and determine the transmit power of the uplink channel or the uplink signal based on the determined power offset term.

Optionally, the N power offset terms are sent by the network side device to the user equipment UE by using higher layer signaling; and the index that is of the power offset term and that is received by the UE is sent by the network side device to the UE by using downlink control signaling.

Optionally, the receiving module is specifically configured to: receive a TPC command field sent by the network side device, where the TPC command field is corresponding to an index of the power offset term, or the TPC command field is corresponding to an index of the power offset term and a TPC command; and determine, from the N power offset terms based on the TPC command field, a power offset term corresponding to the TPC command field.

Optionally, a format of the downlink control signaling is any one of downlink control information DCI formats used for uplink data transmission.

Optionally, the receiving module is specifically configured to receive a power offset term sent by the network side device; and correspondingly, the determining module is specifically configured to determine the transmit power of the uplink channel or the uplink signal based on the received power offset term.

Optionally, the power offset term received by the receiving module is sent by the network side device to the user equipment UE by using higher layer signaling.

Optionally, the uplink channel is an uplink traffic channel or an uplink control channel, and the uplink signal is an uplink reference signal.

A tenth aspect of this application provides a network side device, including a configuration module. The configuration module is configured to configure power offset information for UE, where the power offset information is used to adjust a transmit power of the UE.

Optionally, the configuration module is specifically configured to: send N power offset terms to the UE, where N is a positive integer greater than or equal to 1; and send an index of any one of the N power offset terms to the UE.

Optionally, the network side device sends the N power offset terms to the UE by using higher layer signaling; and the network side device sends an index of the power offset term to the UE by using downlink control signaling.

Optionally, the configuration module is specifically configured to send a TPC command field to the UE, where the TPC command field is corresponding to an index of the power offset term, or a TPC command field is corresponding to the power offset term and a TPC command.

Optionally, a format of the downlink control signaling is any one of downlink control information DCI formats used for uplink data transmission.

Optionally, the configuration module is specifically configured to send a power offset term to the UE.

Optionally, the network side device sends the power offset term to the UE by using higher layer signaling.

An eleventh aspect of this application provides UE. The UE includes a processor, a memory, and a communications interface. The memory is configured to store an instruction, the communications interface is configured to communicate with another device, and the processor is configured to execute the instruction stored in the memory, so that the UE performs the method provided in the first aspect of this application.

A twelfth aspect of this application provides a network side device. The network side device includes a processor, a memory, and a communications interface. The memory is configured to store an instruction, the communications interface is configured to communicate with another device, and the processor is configured to execute the instruction stored in the memory, so that the network side device performs the method provided in the second aspect of this application.

According to the uplink power control method and apparatus provided in this application, the network side device sends the plurality of pieces of configuration information of the RACH to the UE, and indicates, by using the scheduling message of the RACH, the identifier information corresponding to the configuration information of the RACH used by the UE. The UE calculates the transmit power of the RACH based on the configuration information that is of the RACH and that is corresponding to the identifier information, and sends the random access preamble to the network side device based on the transmit power of the RACH. Each piece of configuration information of the RACH is corresponding to a receive beam of the network side device or a transmit beam of the UE, so that the network side device can dynamically adjust the transmit power of the RACH based on changes in beamforming gains of different receive beams or transmit beams, to precisely control the transmit power of the RACH and improve an access success rate of an uplink RACH, thereby implementing maximization of data transmission power efficiency and data transmission performance.

BRIEF DESCRIPTION OF DRAWINGS

FIG. 3 is a schematic diagram of a preamble format according to an embodiment of the disclosure;

DESCRIPTION OF EMBODIMENTS

Figure 1:
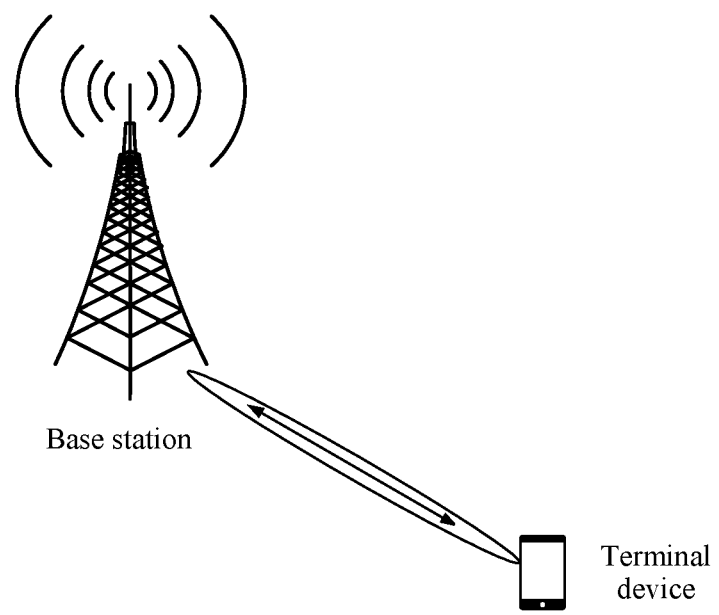
FIG. 1 is a schematic architectural diagram of a communications system applicable to the present disclosure.

This application provides a random access channel power control method. The method may be applied to an existing communications system. FIG. 1 is a schematic architectural diagram of a communications system applicable to this application. As shown in FIG. 1, the communications system includes a base station and a terminal device. There may be one or more terminal devices. The communications system may be Global System for Mobile Communications (GSM), a Code Division Multiple Access (CDMA) system, a Wideband Code Division Multiple Access (WCDMA) system, a Long Term Evolution (LTE) system, or a 5th Generation (5G) mobile communications system. Correspondingly, the base station may be a base transceiver station (BTS) in the GSM system or the CDMA system; or may be a NodeB (NB) in the WCDMA system; or may be an evolved NodeB (eNB), an access point (AP), or a relay node in the LTE system; or may be a base station or the like in the 5G system. This is not limited herein.

The terminal device may be a wireless terminal. The wireless terminal may refer to a device that provides a user with voice and/or data connectivity, a handheld device with a wireless connection function, or another processing device connected to a wireless modem. The wireless terminal may communicate with at least one core network by using a radio access network (RAN). The wireless terminal may be a mobile terminal, such as a mobile phone (or referred to as a "cellular" phone) or a computer with a mobile terminal, for example, may be a portable, pocket-size, handheld, computer built-in, or vehicle-mounted mobile apparatus that exchanges voice and/or data with the radio access network. The wireless terminal may also be referred to as a subscriber unit, a subscriber station, a mobile station, a mobile console (Mobile Station), a remote station, an access point, a remote terminal, an access terminal, a user terminal, user equipment (UE), or a user agent. This is not limited herein.

The method in this application is specifically applied to a random access process. The random access process mainly includes the following steps: The UE receives a system message broadcast by the base station, and obtains configuration information of a random access channel (RACH) from the system message. The UE sends a random access preamble to the base station based on the configuration information of the RACH, and the base station returns a random access response message to the UE. The UE determines a transmit power of the random preamble each time before the UE sends the preamble. The transmit power of the preamble is also referred to as a transmit power of the RACH. The transmit power of the existing RACH may be calculated by using the following formula (1):

$$P = \min\{P_{max}, PL + P_{o,pre} + \text{deltapre} + (N_{pre} - 1) dPrampup\} \quad (1)$$

Herein, P represents the transmit power of the RACH; Pmax represents a maximum transmit power of the UE; Po,pre represents a target receive power of the base station; PL is a path loss value obtained by the UE through estimation based on downlink broadcast information; deltapre represents a format correction value of a preamble and is used to represent an adjustment amount that is of the transmit power of the RACH and that is caused by different preamble formats; Npre represents a quantity of times of sending the preamble; and dPrampup represents a power ramping step when the preamble is retransmitted. The target receive power of the base station is a receive power used by the base station to receive the preamble, a dynamic range of Po,pre is [−120, −90] dBm, resolution is 2 dB, possible values of dPrampup are [0, 2, 4, 6] dB, and Npre is a maximum quantity of times of sending the preamble. The UE attempts, for a plurality of times, to send the preamble in an access phase. The quantity of times of sending the preamble by the UE cannot be greater than Npre. Each time the UE retransmits the preamble, the UE continuously increases the transmit power of the RACH. Each time the UE retransmits the preamble, the UE increases the transmit power of the RACH by using dPrampup as a step.

When receiving the preamble sent by the UE, the base station uses a beamforming technology. In addition, the base station may use different receive beams to receive the preamble. Different receive beams are corresponding to different beamforming gains, and different receive beams use different power control parameter sets. Alternatively, when sending the preamble, the UE may send the preamble by using different transmit beams. Different transmit beams are corresponding to different beamforming gains. However, an existing power control mechanism is based on omnidirectional transmission or fixed receive beam transmission. For a scenario in which a receive beam changes, if the existing power control mechanism is still used, the transmit power of the RACH is not precise enough.

Figure 2:
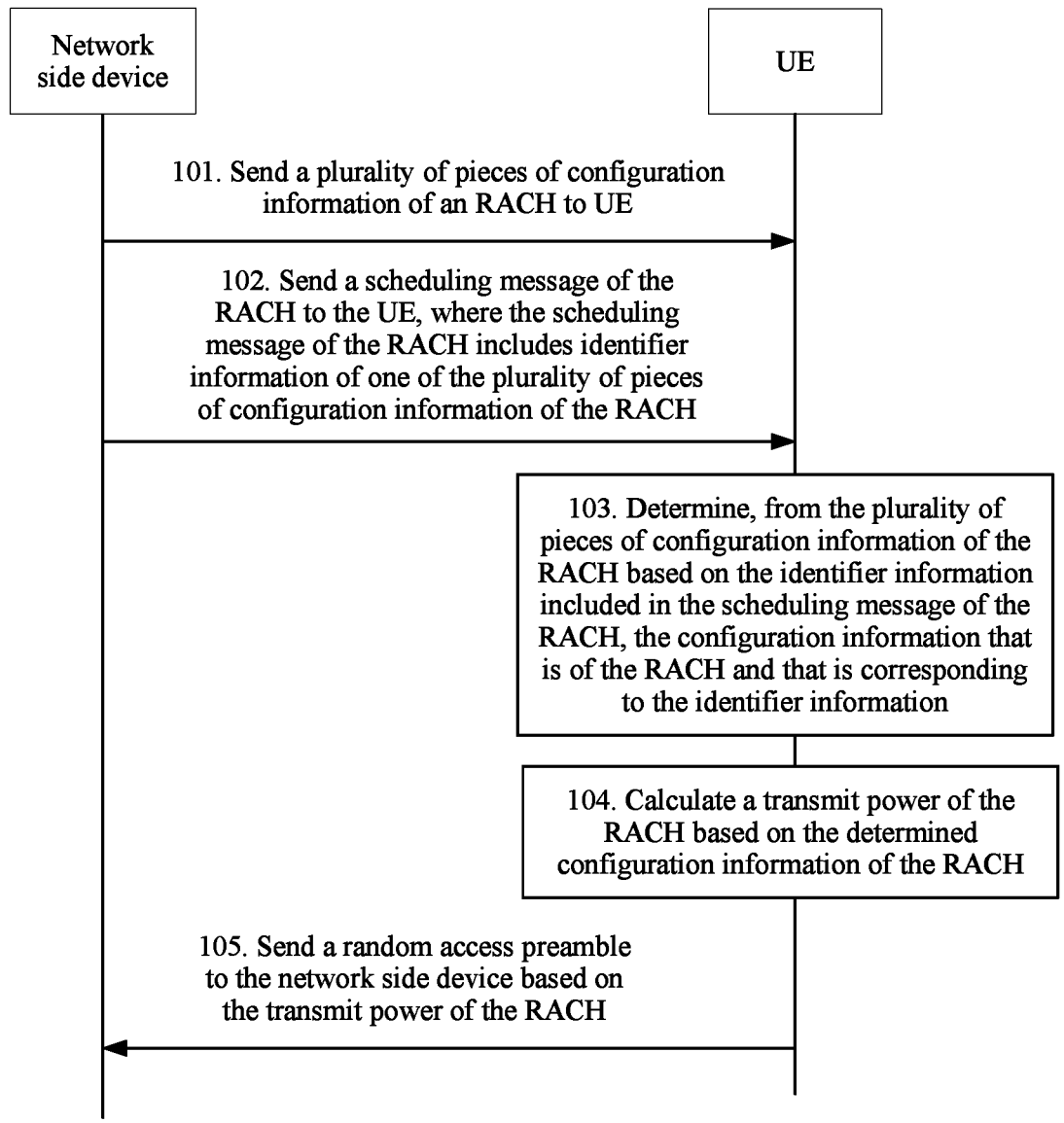
FIG. 2 is a flowchart of an uplink power control method according to an embodiment of the disclosure.

To resolve a prior-art problem, this application provides a random access channel power control method. FIG. 2 is a flowchart of an uplink power control method according to Embodiment 1. As shown in FIG. 2, the method in this embodiment may include the following steps.

Step 101: A network side device sends a plurality of pieces of configuration information of a random access channel (RACH) to UE.

Correspondingly, the UE receives the plurality of pieces of configuration information of the RACH that are sent by the network side device. Each piece of configuration information of the RACH includes one or more pieces of the following information: a power offset value of a receive beam used by the network side device, format information of a random access preamble (preamble format), a target receive power of the network side device, a format correction value of the preamble, a quantity of times of sending the preamble, and power ramping step information when the preamble is retransmitted. The network side device may send the plurality of pieces of configuration information of the RACH by using a broadcast channel or a system message. The broadcast channel may be a broadcast channel of a 5G system or a broadcast channel in an LTE system. The system message may be a system information block (SIB) or the like in the LTE system or newly-defined system information in the 5G system. The network device may be a base station.

In the configuration information of the RACH, the power offset value of the receive beam used by the network side device is a newly-added parameter in this application. The power offset value of the receive beam is a real number, and different receive beams may be corresponding to different power offset values. The power offset value of the receive beam is determined by the network side device based on a change in a beamforming gain of the receive beam, or the power offset value of the receive beam is determined by the network side device based on a change in a beamforming gain of a transmit beam of the UE. The power offset value of the receive beam is used to compensate for an offset that is of the transmit power of the RACH and that is caused by the change in the beamforming gain, so that the transmit power that is of the RACH and that is obtained by the UE through calculation is more accurate.

Definitions of four parameters: the target receive power of the network side device, the format correction value of the preamble, the quantity of times of sending the preamble, and the power ramping step when the preamble is retransmitted are the same as those in the prior art. The four parameters are related to the preamble format, and different preamble formats are corresponding to different sets of four parameters.

In this embodiment, the preamble includes S cyclic prefixes (CP) and T sequences. A length of each cyclic prefix is Tcp, and a length of each sequence is Tseq. The format information of the preamble includes a quantity S of cyclic prefixes and/or a quantity T of sequences, and S and T are integers greater than or equal to 1. Herein, S and T may be flexibly configured. Different preamble formats are corresponding to different sets of values of S and T.

Optionally, the quantity S of cyclic prefixes and the quantity T of sequences meet the following: T is an integer multiple of S. Therefore, the format information of the preamble may include only the quantity S of cyclic prefixes or only the quantity T of sequences. The UE obtains, based on a correspondence between S and T, T by using S, or S by using T.

FIG. 3 is a schematic diagram of a preamble format. FIG. 3 includes two types of preamble formats. T sequences of a preamble in a first type of preamble format are corresponding to one transmit beam, and T sequences of a preamble in a second type of preamble format are corresponding to a plurality of transmit beams. When the T sequences are corresponding to the plurality of transmit beams, a start frequency domain resource location of each transmit beam in the plurality of transmit beams is related to an index of a sequence in the T sequences. For example, it is assumed that time frequency resources occupied by each transmit beam are six resource blocks (RB), a transmit beam 1 is corresponding to a first sequence in the T sequences, and a start frequency domain resource location of the transmit beam is f1, a start frequency domain resource location of a transmit beam i (i is greater than or equal to 2) is f1+(i−1)×6. Herein, i is also an index of time frequency resources occupied by the transmit beam i in the T sequences. The network side device can configure, based on different scenarios, the UE to use different types of preamble formats.

The first type of preamble format is applicable to a scenario in which the network side device polls a plurality of receive beams. In this scenario, the UE repeatedly sends the preamble for a plurality of times based on a same transmit beam, the network side device each time receives the preamble by using a different receive beam, and the network side device determines an optimal receive beam based on the preamble received for the plurality of times. In this type of preamble format, the quantity S of cyclic prefixes is equal to 1, the quantity T of sequences is greater than 1, and a last part is a guard period (GP). This type of preamble format may implement minimization of overheads of the cyclic prefix. Because the cyclic prefix cannot be used to transmit a valid data signal, a format of the minimized cyclic prefix may improve transmission efficiency of a preamble. In the example shown in FIG. 2, in a first type of preamble format, three sequences are corresponding to one transmit beam, in other words, the UE repeatedly sends the preamble for three times based on a same transmit beam; and correspondingly, the network side device each time receives the preamble by using one receive beam, and finally, the network side device determines an optimal receive beam from three receive beams based on the preamble received for three times.

The second type of preamble format is applicable to a scenario in which the UE polls a plurality of transmit beams. In this scenario, the UE sends preambles for a plurality of times based on different transmit beams, and the network side device determines an optimal transmit beam based on the plurality of preambles received for the plurality of times. Because different transmit beams are corresponding to different beamforming gains, preambles transmitted by the UE by using different transmit beams may have a same cyclic prefix length or different cyclic prefix lengths, and/or a same sequence length or different sequence lengths. In this type of preamble format, both the quantity S of cyclic prefixes and the quantity T of sequences are greater than 1, and a last part is a GP. This type of preamble format may implement optimization of performance of the preamble for different transmit beams, and therefore preamble transmission efficiency can be improved.

In the example shown in FIG. 3, the second type of preamble format includes two subtypes. In a subtype 1, T (T≥1) sequences are corresponding to T transmit beams. For example, when T=3, three sequences (a sequence 1, a sequence 2, and a sequence 3) are corresponding to three transmit beams. The UE sequentially sends the T preambles by using three transmit beams, and the T preambles may have a same cyclic prefix length or different cyclic prefix lengths, and/or a same sequence length or different sequence lengths. The network side device receives the three preambles, and determines an optimal transmit beam based on the received three preambles. A subtype 2 is a combination of the first type and the subtype 1, three sequences are corresponding to three transmit beams, and each transmit beam is used to send the preambles for twice.

In this embodiment, each piece of configuration information of the RACH is corresponding to a receive beam of the network side device. Different receive beams are corresponding to different configuration information of the RACH. When the network side device uses a different receive beam, the UE calculates the transmit power of the RACH by using an RACH configuration parameter corresponding to the receive beam.

Optionally, each piece of configuration information of the RACH is corresponding to a transmit beam of the UE. Different transmit beams of the UE are corresponding to different configuration information of the RACH. When the UE uses different transmit beams, the UE calculates the transmit power of the RACH by using the configuration information that is of the RACH, that is corresponding to the different transmit beams, and that is configured by the network device.

Step 102: The network side device sends a scheduling message of the RACH to the UE, where the scheduling message of the RACH includes identifier information of one of the plurality of pieces of configuration information of the RACH.

The UE receives the scheduling message that is of the RACH and that is sent by the network side device. The scheduling message of the RACH may be specifically indicated by the network side device to the UE by using a physical layer control command. The network side device dynamically indicates, by using a control channel command, one of the plurality of pieces of configuration information of the RACH that are currently used by the UE.

Step 103: The UE determines, from the plurality of pieces of configuration information of the RACH based on the identifier information included in the scheduling message of the RACH, the configuration information that is of the RACH and that is corresponding to the identifier information.

Each of the plurality of pieces of configuration information of the RACH has one piece of identifier information. The UE searches, based on the identifier information of the configuration information that is of the RACH and that is indicated by using the physical layer control command, the plurality of pieces of configuration information of the RACH for the configuration information that is of the RACH and that is corresponding to the identifier information.

Step 104: The UE calculates a transmit power of the RACH based on the determined configuration information of the RACH.

The four parameters: the target receive power of the network side device, the format correction value of the preamble, the quantity of times of sending the preamble, and the power ramping step when the preamble is retransmitted are collectively referred to as power control parameters below. Configuration information that is of an RACH and that is corresponding to each piece of identifier information includes one or more of the power offset values of the receive beam used by the network side device, the format information of the random access preamble, the target receive power of the network side device, the format correction value of the preamble, the quantity of times of sending the preamble, and the power ramping step when the preamble is retransmitted.

When the configuration information that is of the RACH and that is corresponding to the identifier information does not include the power offset value of the receive beam used by the network side device, the transmit power of the RACH is calculated by using the foregoing formula (1). When the configuration information that is of the RACH and that is corresponding to the identifier information includes the power offset value of the receive beam of the RACH, the transmit power of the RACH is calculated by using the following formula (2):

$$P=\min\{P\max, PL+Po, \text{pre}+\text{deltapre}+(N\text{pre}-1)dP\text{rampup}+\text{delta}BF\} \quad (2)$$

Compared with formula (1), formula (2) has one more term: the power offset value deltaBF of the receive beam used by the network side device.

When the configuration information that is of the RACH and that is corresponding to the identifier information includes only the power offset value of the receive beam used by the network side device, the network side device needs to send, to the UE in another manner, a power control parameter corresponding to each receive beam. The UE calculates the transmit power of the RACH by using the foregoing formula (2) based on the power offset value of the receive beam used by the network side device and the power control parameter corresponding to the receive beam.

When the configuration information that is of the RACH and that is corresponding to the identifier information includes only the format information of the random access preamble, the UE first determines a format of the preamble based on the format information of the preamble. Different preamble formats are corresponding to different power control parameters. Correspondingly, the network side device needs to send, to the UE in another manner, all power control parameters corresponding to various formats of preambles; and the UE determines, based on the format information of the preamble from the pre-obtained power control parameters corresponding to the formats of preambles, a power control parameter corresponding to the format information of the preamble, and further calculates the transmit power of the RACH by using the foregoing formula (1) based on the power control parameter corresponding to the format information of the preamble.

When the configuration information that is of the RACH and that is corresponding to the identifier information includes the power offset value of the receive beam used by the network side device and the format information of the random access preamble, the UE first determines, based on the format information of the preamble, the power control parameter corresponding to the format information of the preamble, and then calculates the transmit power of the RACH by using the foregoing formula (2) based on the power offset value of the receive beam used by the network side device and the power control parameter corresponding to the format information of the preamble.

When the configuration information that is of the RACH and that is corresponding to the identifier information includes only any one, any two, or any three of the power control parameters, a remaining power control parameter other than the power control parameter included in the configuration information that is of the RACH and that is corresponding to the identifier information is a shared power control parameter of a plurality of receive beams. The shared power control parameter is sent by the network side device to the UE in advance. After determining the configuration information that is of the RACH and that is corresponding to the identifier information, the UE calculates the transmit power of the RACH by using the foregoing formula (1) based on the power control parameter included in the configuration information that is of the RACH and that is corresponding to the identifier information and the pre-obtained shared power control parameter. For example, when the configuration information that is of the RACH and that is corresponding to the identifier information includes only the target receive power of the network side device, the format correction value of the preamble, the quantity of times of sending the preamble, and the power ramping step when the preamble is retransmitted are shared power control parameters. The UE calculates the transmit power of the RACH by using the foregoing formula (1) based on the shared power control parameters and the target receive power of the network side device that is included in the configuration information that is of the RACH and that is corresponding to the identifier information.

When the configuration information that is of the RACH and that is corresponding to the identifier information includes only the quantity of times of sending the preamble and/or the power ramping step when the preamble is retransmitted, the UE calculates the transmit power of the RACH by using the foregoing formula (1) based on a pre-obtained shared power control parameter and the quantity of times of sending the preamble of the RACH and/or the power ramping step when the preamble is retransmitted that are/is included in the configuration information that is of the RACH and that is corresponding to the identifier information. When the transmit beam of the UE is switched, the network side device may reset, maintain, or increase a parameter of a quantity of power ramping times in the configuration information of the RACH.

When the configuration information that is of the RACH and that is corresponding to the identifier information includes all the power control parameters, the UE calculates the transmit power of the RACH by using the foregoing formula (1) based on all the power control parameters included in the configuration information that is of the RACH and that is corresponding to the identifier information.

When the configuration information that is of the RACH and that is corresponding to the identifier information includes both the power offset value of the receive beam used by the network side device and any one or more power control parameters, the UE calculates the transmit power of the RACH by using the foregoing formula (2) based on a pre-obtained shared power control parameter, and the power offset value of the receive beam used by the network side device and the power control parameter that are included in the configuration information that is of the RACH and that is corresponding to the identifier information.

Step 105: The UE sends a random access preamble to the network side device based on the transmit power of the RACH.

In the method in this embodiment, the network side device sends the plurality of pieces of configuration information of the RACH to the UE, and indicates, by using the scheduling message of the RACH, the identifier information corresponding to the configuration information of the RACH used by the UE. The UE calculates the transmit power of the RACH based on the configuration information that is of the RACH and that is corresponding to the identifier information, and sends the random access preamble to the network side device based on the transmit power of the RACH. Each piece of configuration information of the RACH is corresponding to a receive beam of the network side device or a transmit beam of the UE, so that the network side device can dynamically adjust the transmit power of the RACH based on changes in beamforming gains of different receive beams or transmit beams, to precisely control the transmit power of the RACH and improve an access success rate of an uplink RACH.

Figure 4:
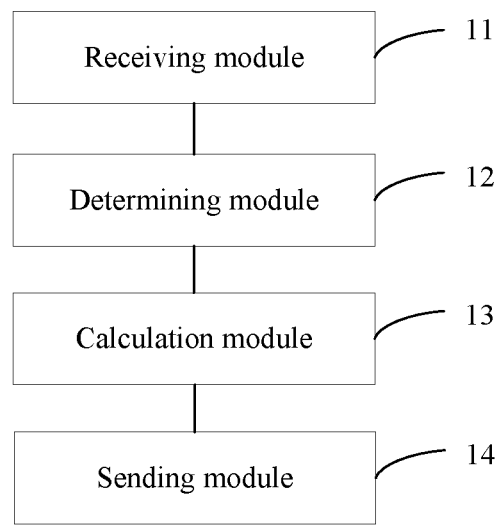
FIG. 4 is a schematic structural diagram of a UE according to an embodiment of the disclosure.

FIG. 4 is a schematic structural diagram of UE according to Embodiment 2. As shown in FIG. 4, the UE in this embodiment includes a receiving module 11, a determining module 12, a calculation module 13, and a sending module 14.

The receiving module 11 is configured to receive a plurality of pieces of configuration information of a random access channel RACH that are sent by a network side device.

The receiving module 11 is further configured to receive a scheduling message that is of the RACH and that is sent by the network side device, where the scheduling message of the RACH includes identifier information of one of the plurality of pieces of configuration information of the RACH.

The determining module 12 is configured to determine, from the plurality of pieces of configuration information of the RACH based on the identifier information included in the scheduling message of the RACH, the configuration information that is of the RACH and that is corresponding to the identifier information.

The calculation module 13 is configured to calculate a transmit power of the RACH based on the configuration information that is of the RACH and that is determined by the determining module 12.

The sending module 14 is configured to send a random access preamble to the network side device based on the transmit power of the RACH.

Optionally, each piece of configuration information of the RACH includes one or more pieces of the following information: a power offset value of a receive beam used by the network side device, format information of a random access preamble, a target receive power of the network side device, a format correction value of the preamble, a quantity of times of sending the preamble, and power ramping step information when the preamble is retransmitted.

Optionally, each piece of configuration information of the RACH is corresponding to a receive beam of the network side device.

Optionally, each piece of configuration information of the RACH is corresponding to a transmit beam of the UE.

Optionally, the plurality of pieces of configuration information of the RACH are sent by the network side device to the UE by using a broadcast channel or system information.

Optionally, the scheduling message of the RACH is indicated by the network side device to the UE by using a physical layer control command.

Optionally, the preamble includes S cyclic prefixes and T sequences, and the format information of the preamble includes a quantity S of cyclic prefixes and/or a quantity T of sequences, where S and T are integers greater than or equal to 1.

Optionally, the quantity S of cyclic prefixes and the quantity T of sequences meet the following: T is an integer multiple of S.

Optionally, when a transmit beam of the UE is switched, a quantity of power ramping times that is included in the configuration information of the RACH remains unchanged.

Embodiment 3 provides a network side device. The network side device in this embodiment includes a sending module. The sending module is configured to send a plurality of pieces of configuration information of a random access channel RACH to UE, and send a scheduling message of the RACH to the UE. The scheduling message of the RACH includes identifier information of one of the plurality of pieces of configuration information of the RACH.

Optionally, each piece of configuration information of the RACH includes one or more pieces of the following information: a power offset value of a receive beam used by the network side device, format information of a random access preamble, a receive power of the network side device, a format correction value of the preamble, a quantity of times of sending the preamble, and power ramping step information when the preamble is retransmitted.

Optionally, each piece of configuration information of the RACH is corresponding to a receive beam of the network side device.

Optionally, each piece of configuration information of the RACH is corresponding to a transmit beam of the UE.

Optionally, the plurality of pieces of configuration information of the RACH are sent by the network side device to the UE by using a broadcast channel or system information.

Optionally, the scheduling message of the RACH is indicated by the network side device to the UE by using a physical layer control command.

Optionally, the preamble includes S cyclic prefixes and T sequences, and the format information of the preamble includes a quantity S of cyclic prefixes and/or a quantity T of sequences, where S and T are integers greater than or equal to 1.

Optionally, the quantity S of cyclic prefixes and the quantity T of sequences meet the following: T is an integer multiple of S.

Optionally, when a transmit beam of the UE is switched, a quantity of power ramping times that is included in the configuration information of the RACH remains unchanged.

Figure 5:
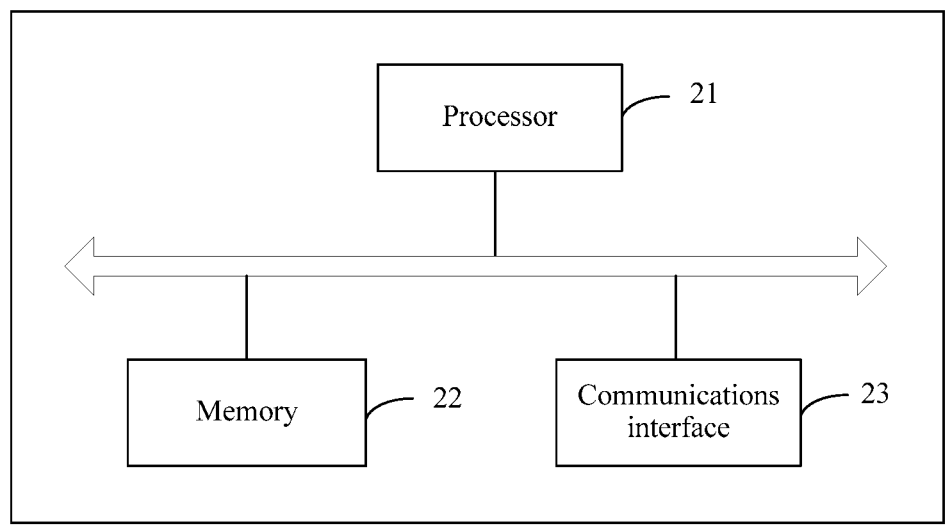
FIG. 5 is a schematic structural diagram of a UE according to an embodiment of the disclosure.

FIG. 5 is a schematic structural diagram of UE according to Embodiment 4. As shown in FIG. 5, the UE provided in this embodiment includes a processor 21, a memory 22, and a communications interface 23. The memory 22 and the communications interface 23 are connected to and communicate with the processor 21 by using a bus. The memory 22 is configured to store an instruction. The communications interface 23 is configured to communicate with another device. The processor 21 is configured to execute the instruction stored in the memory 22, so that the UE performs the method performed by the UE in Embodiment 1. The communications interface 23 can be configured to: send data to a network side device, and receive data sent by the network side device, and the communications interface 23 may include a receiver and a transmitter.

Figure 6:
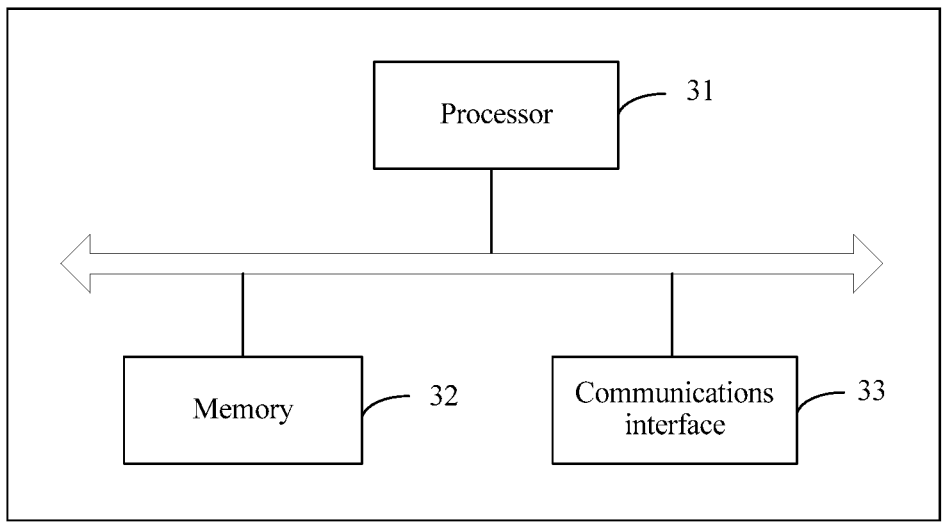
FIG. 6 is a schematic structural diagram of a network side device according to an embodiment of the disclosure.

FIG. 6 is a schematic structural diagram of a network side device according to Embodiment 5. As shown in FIG. 6, the network side device provided in this embodiment includes a processor 31, a memory 32, and a communications interface 33. The memory 32 and the communications interface 33 are connected to and communicate with the processor 31 by using a bus. The memory 32 is configured to store an instruction. The communications interface 33 is configured to communicate with another device. The processor 31 is configured to execute the instruction stored in the memory 32, so that the network side device performs the method performed by the network side device in Embodiment 1. The communications interface 33 can be configured to: send data to UE, and receive data sent by the UE, and the communications interface 33 may include a receiver and a transmitter.

Figure 7:
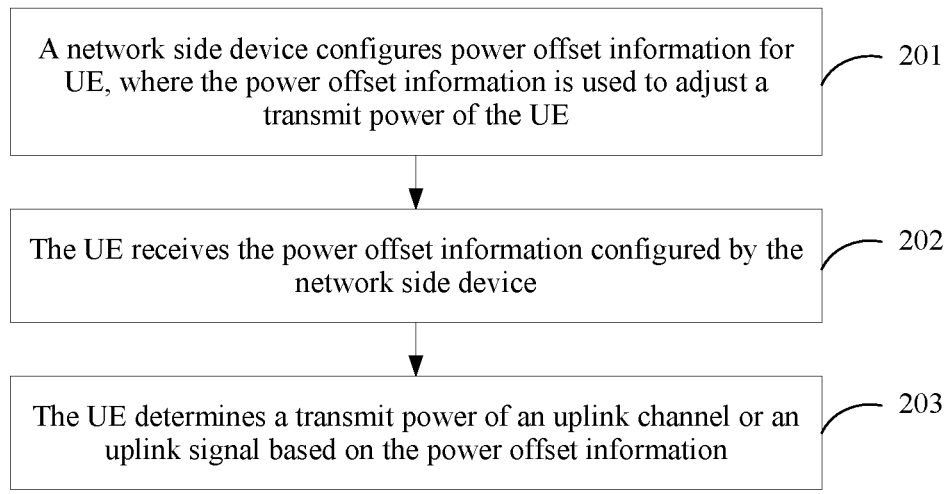
FIG. 7 is a flowchart of an uplink power control method according to an embodiment of the disclosure.

FIG. 7 is a flowchart of an uplink power control method according to Embodiment 6. As shown in FIG. 7, the method provided in this embodiment includes the following steps.

Step 201: A network side device configures power offset information for UE, where the power offset information is used to adjust a transmit power of the UE.

Step 202: The UE receives the power offset information configured by the network side device.

The power offset information is determined by the network side device based on a change in a beamforming gain of the UE or the network side device. Optionally, before step 201, the network side device generates the power offset information based on the change in the beamforming gain on a UE side or a network device side. Each power offset term is corresponding to a compensation term of a beamforming gain. The change in the beamforming gain may be caused by a change in a quantity of antenna ports of formed beams, or may be caused by a direction change in a formed beam. Alternatively, there may be another reason for the current change in the beamforming gain. When the quantity of antenna ports generating the formed beams is changed from T (T≥2) to T/2, a power offset term caused by the change in the beamforming gain is 3 dB (in this case, the quantity of antenna ports for generating the formed beams is changed from T to T/2, and therefore a generated change in the beamforming gain is 3 dB). In addition, when a formed beam of a transmit end or a receive end is changed from a beam 1 (such as a formed beam at a 45-degree phase) to a beam 2 (such as a formed beam at a 60-degree phase), a power offset term caused by a change in a beamforming gain may be 0.8 dB (the change that is in the beamforming gain and that is caused by a direction change in the formed beam), and beamforming may be beamforming of the transmit end or the receive end. This is not limited herein.

In a first implementation, the network side device first sends N power offset terms to the UE, the N power offset terms may be represented as {AG1, AG2, . . . , AGN}, and AGi is any real number. The network side device can send the N power offset terms to the UE by using higher layer signaling. The network side device further establishes an index for each power offset term, and N power offset terms are corresponding to N indexes. The index of the power offset term may be indicated by using several bits. For example, when a value of N is 4, the index of the power offset term may be indicated by using 2 bits, and indexes of four power offset terms may be indicated by using 00, 01, 10, and 11. Subsequently, the network side device sends an index of any one of the N power offset terms to the UE. Specifically, before sending the index of the power offset term, the network side device determines a power offset term corresponding to the current change in the beamforming gain from the N power offset terms based on the change in the beamforming gain, and sends, to the UE, the index of the power offset term corresponding to the current change in the beamforming gain. The network side device sends the index of the power offset term to the UE by using downlink control signaling. The UE receives the N power offset terms and the index that is of any power offset term and that is sent by the network side device.

It should be understood that a size N of a set of values of power offset terms is usually a fixed value, to ensure that a quantity of bits of control signaling corresponding to the index of the power offset term is a fixed value.

The network side device may specifically send the index of the power offset term by using a TPC command field in the downlink control signaling. The network side device sends a TPC command field to the UE. The TPC command field is corresponding to an index of the power offset term, or the TPC command field is corresponding to the power offset term and a TPC command. The downlink control signaling is in any of downlink control information (DCI) formats used for uplink data transmission, for example, a DCI format 0/3/3A/4 in a Long Term Evolution (LTE) system.

The set of values corresponding to the power offset terms needs to at least include one value of 0 dB, and the value of 0 dB is used to indicate that the UE does not perform a power adjustment on an uplink channel or an uplink signal when the beamforming gain changes.

It is assumed that values of the TPC command in the TPC command field are shown in Table 1. A cumulative form and an absolute form are two indication manners of the TPC command.

TABLE 1

| TPC command field for a DCI format 0/3/3A/4 | TPC command $\delta_{PUSCH,c}$ [dB] in a cumulative form | TPC command $\delta_{PUSCH,c}$ [dB] in an absolute form, applicable to a DCI format 0/4 |
|---|---|---|
| 0 | −1 | −4 |
| 1 | 0 | −1 |
| 2 | 1 | 1 |
| 3 | 3 | 4 |

It is assumed that a set of power offset terms configured by the network side device is {0.2, 0.6, 0.8, 1.2}. If the index of the power offset term and the TPC command are independently used for indication, values of the TPC command corresponding to the power offset term are shown in Table 2:

TABLE 2

| TPC command field for a DCI format 0/3/3A/4 | TPC command $\delta_{PUSCH,c}$ [dB] corresponding to a power offset term |
|---|---|
| 0 | 0.2 |
| 1 | 0.6 |
| 2 | 0.8 |
| 3 | 1.2 |

If the TPC command and the power offset term are combined and represented as a TPC command field, in this case, a quantity of bits in the TPC command field is 4, and values of the TPC command field are shown in Table 3.

TABLE 3

| New TPC command field for a DCI format 0/3/3A/4 | New TPC command $\delta_{PUSCH,c}$ [dB] in a cumulative form | New TPC command $\delta_{PUSCH,c}$ [dB] in an absolute form, applicable to a DCI format 0/4 |
|---|---|---|
| 0 | −1 + 0.2 | −4 + 0.2 |
| 1 | 0 + 0.2 | −1 + 0.2 |
| 2 | 1 + 0.2 | 1 + 0.2 |
| 3 | 3 + 0.2 | 4 + 0.2 |
| 4 | −1 + 0.6 | −4 + 0.6 |
| 5 | 0 + 0.6 | −1 + 0.6 |
| 6 | 1 + 0.6 | 1 + 0.6 |
| 7 | 3 + 0.6 | 4 + 0.6 |
| 8 | −1 + 0.8 | −4 + 0.8 |
| 9 | 0 + 0.8 | −1 + 0.8 |
| 10 | 1 + 0.8 | 1 + 0.8 |
| 11 | 3 + 0.8 | 4 + 0.8 |
| 12 | −1 + 1.2 | −4 + 1.2 |
| 13 | 0 + 1.2 | −1 + 1.2 |
| 14 | 1 + 1.2 | 1 + 1.2 |
| 15 | 3 + 1.2 | 4 + 1.2 |

In a second implementation, the network side device sends the power offset term to the UE. Specifically, when the beamforming gain changes, the network side device determines, from N power offset terms, a power offset term corresponding to the current change in the beamforming gain, and sends the power offset term or an index of the power offset term to the UE, and the UE receives the power offset term sent by the network side device. The network side device can send the power offset term or the index of the power offset term to the UE by using higher layer signaling.

Step 203: The UE determines a transmit power of an uplink channel or an uplink signal based on the power offset information.

First, the UE determines the power offset term based on the power offset information, and then calculates the transmit power of the uplink channel or the uplink signal based on the power offset term. When the power offset information is the index of the power offset term, the UE determines, based on the power offset term from the N power offset terms received in advance, a power offset term corresponding to the received index of the power offset term. When the power offset information is the power offset term, the UE directly calculates the transmit power of the uplink channel or the uplink signal by using the power offset term. The uplink channel is an uplink traffic channel or an uplink control channel. The uplink traffic channel may be a physical uplink shared channel (PUSCH), and the uplink control channel may be a physical uplink control channel (PUCCH). The uplink signal may be an uplink reference signal, and the uplink reference signal may be a sounding reference signal (SRS). In addition, the uplink channel or the uplink signal may alternatively be any other uplink channel or signal other than the PUSCH, the PUCCH, or the SRS.

In this embodiment, the transmit power of the PUSCH when the power offset term caused by the change in the beamforming gain is considered may be expressed as:

$$P_{PUSCH,c}(i) = \min \begin{cases} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) + \Delta_{AG}(i) \end{cases}$$

$P_{CMAX,c}(i)$ is a total transmit power of the UE on a carrier c of a primary serving cell.

$M_{PUSCH,c}(i)$ is a quantity of resource blocks scheduled for the PUSCH, and a unit of $M_{PUSCH,c}(i)$ is a $P_{RB}$.

$P_{O\_PUSCH,c}(j)$ includes two terms: $P_{O\_NOMINAL\_PUSCH,c}(j)$ and $P_{O\_UE\_PUSCH,c}(j)$, is used to represent a target receive power of the UE, and is configured through higher layer RRC signaling in a semi-static manner. $P_{O\_NOMINAL\_PUSCH,c}(j)$ is a cell-specific parameter, occupies 8 bits, and is configured through Radio Resource Control (RRC) signaling in the semi-static manner.

$\alpha_c(j)$ is a path loss compensation factor, is a cell-specific parameter, occupies 3 bits, and is configured through higher layer RRC signaling in the semi-static manner.

$PL_c$ is a path loss measurement value obtained by the UE based on reference signal received power (RSRP).

$\Delta_{TF,c}(i)=10\ \log_{10}((2^{BPRE \cdot K_s}-1)\cdot\beta_{offset}^{PUSCH})$ is a power adjustment value for a different modulation and coding scheme, is the cell-specific parameter, and is configured through higher layer RRC signaling in the semi-static manner.

$f_c(i)$ is a closed-loop power adjustment amount, and is a feedback value quantized by a receive end based on a receive/measurement error.

$\Delta_A(i)$ is the power offset term caused by the change in the beamforming gain.

$\Delta_{AG}(i)$ and $f_c(i)$ are corresponding to the TPC command field. $\Delta_{AG}(i)$ and $f_c(i)$ in the TPC command field may be combined into one term, or may be represented as two terms. This is not limited herein.

Further, the transmit power of the PUSCH may be represented in any other form. This is not limited herein.

In this embodiment, the transmit power of the PUCCH when the power offset term caused by the change in the beamforming gain is considered may be expressed as:

$$P_{PUCCH}(i) = \min\begin{cases} P_{CMAX,c}(i), \\ P_{0\_PUCCH} + PL_c + h(n_{CQI}, n_{HARQ}, n_{SR}) + \\ \Delta_{F\_PUCCH}(F) + \Delta_{TxD}(F') + g(i) + \Delta_{AG}(i) \end{cases}$$

where $P_{0\_PUCCH}$ represents the target receive power of the UE, and is configured through higher layer RRC signaling in the semi-static manner.

$\Delta_{F\_PUCCH}(F)$ is a power control adjustment parameter related to a PUCCH format and is determined based on a higher layer configuration parameter.

$h(n_{CQI}, n_{HARQ}, n_{SR})$ is a variable related to PUCCH transmission information.

$\Delta_{TxD}(F')$ is a parameter related to a quantity of antenna ports for PUCCH sending and a PUCCH transmission mode.

$g(i)$ is a closed-loop power control adjustment value and is determined based on a TPC command sent by a network device.

$\Delta_{AG}(i)$ is the power offset term caused by the change in the beamforming gain.

$\Delta_{AG}(i)$ and $g(i)$ are corresponding to the TPC command field. $\Delta_{AG}(i)$ and $g(i)$ in the TPC command field may be combined into one term, or may be represented as two terms. This is not limited herein.

Further, the transmit power of the PUCCH may be represented in any other form. This is not limited herein.

In this embodiment, the transmit power of the SRS when the power offset term caused by the change in the beamforming gain is considered may be expressed as:

$$P_{SRS,c}(i)=\min\{P_{CMAX,c}(i)+P_{SRS\_OFFSET,c}(m)+10\ \log_{10}(M_{SRS,c})+P_{0\_PUSCH,c}(j)+\alpha_c(j)\cdot PL_c+f_c(i)+\Delta_{AG}(i)\},$$

where $P_{SRS\_OFFSET,c}(m)$ represents an offset value that is of the transmit power of the PUSCH and the transmit power of the SRS and that is caused by different modulation and coding schemes.

$M_{SRS,c}$ represents SRS transmission bandwidth of the UE, and another parameter has a same meaning and value as a corresponding parameter in the PUSCH formula.

$\Delta_{AG}(i)$ and $f_c(i)$ are corresponding to the TPC command field. $\Delta_{AG}(i)$ and $f_c(i)$ in the TPC command field may be combined into one term, or may be represented as two terms. This is not limited herein.

Further, the transmit power of the PUSCH may be represented in any other form. This is not limited herein.

It should be noted that power control formulas used for the PUSCH, the PUCCH, and the SRS are merely examples. Optionally, the power control formula may be a power control formula in any other form. This is not limited in this embodiment.

It should be noted that the uplink power control solution in this embodiment is applicable to both a single-carrier scenario and a multicarrier scenario, such as a transmit power setting of an uplink channel or an uplink signal in each cell or each base station in a dual connectivity (DC) or carrier aggregation (CA) scenario.

In this embodiment, the network side device configures the power offset information for the UE. The power offset information is used to adjust the transmit power of the UE. The power offset information is determined by the network side device based on the change in the beamforming gain of the UE or the network side device. The UE receives the power offset information sent by the network device, and determines the transmit power of the uplink channel or the uplink signal based on the power offset information. Because the power offset caused by the change in the beamforming gain is considered when the transmit power of the uplink channel or the uplink channel is determined, the transmit power obtained through calculation is more accurate.

Figure 8:
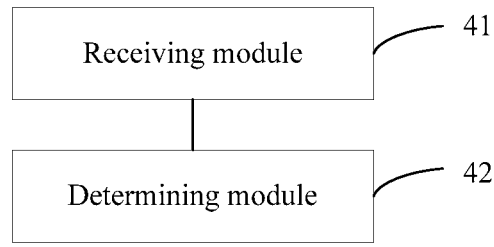
FIG. 8 is a schematic structural diagram of a UE according to an embodiment of the disclosure.

FIG. 8 is a schematic structural diagram of UE according to Embodiment 7. As shown in FIG. 8, UE provided in this embodiment includes:

a receiving module 41, configured to receive power offset information configured by a network side device, where the power offset information is used to adjust a transmit power of the UE; and a determining module 42, configured to determine a transmit power of an uplink channel or an uplink signal based on the power offset information.

The receiving module 41 is specifically configured to: receive N power offset terms sent by the network side device, where N is a positive integer greater than or equal to 1; and receive an index of any one of the N power offset terms sent by the network side device. Correspondingly, the determining module is specifically configured to: determine, from the N power offset terms based on the received index of the power offset term, a power offset term corresponding to the index; and determine the transmit power of the uplink channel or the uplink signal based on the determined power offset term.

Optionally, the N power offset terms are sent by the network side device to the UE by using higher layer signaling; and the index that is of the power offset term and that is received by the UE is sent by the network side device to the UE by using downlink control signaling. Correspondingly, the receiving module is specifically configured to: receive a TPC command field sent by the network side device, where the TPC command field is corresponding to an index of the power offset term, or the TPC command field is corresponding to an index of the power offset term and a TPC command; and determine, from the N power offset terms based on the TPC command field, a power offset term corresponding to the TPC command field.

Optionally, a format of the downlink control signaling is any one of downlink control information DCI formats used for uplink data transmission.

Optionally, the receiving module 41 is specifically configured to receive a power offset term sent by the network side device; and the determining module is specifically configured to determine the transmit power of the uplink channel or the uplink signal based on the received power offset term.

Optionally, the power offset term received by the receiving module 41 is sent by the network side device to the UE by using higher layer signaling.

Optionally, the uplink channel is an uplink traffic channel or an uplink control channel, and the uplink signal is an uplink reference signal.

The UE provided in this embodiment may be configured to perform the steps performed by the UE in Embodiment 6. A specific implementation and a technical effect are similar to those in Embodiment 6. Details are not described herein again.

Embodiment 8 provides a schematic structural diagram of a network side device. The network side device provided in this embodiment includes a configuration module. The configuration module is configured to configure power offset information for UE, where the power offset information is used to adjust a transmit power of the UE.

Optionally, the configuration module is specifically configured to: send N power offset terms to the UE, where N is a positive integer greater than or equal to 1; and send an index of any one of the N power offset terms to the UE.

Optionally, the network side device sends the N power offset terms to the UE by using higher layer signaling; and the network side device sends an index of the power offset term to the UE by using downlink control signaling. Correspondingly, the configuration module is specifically configured to send a TPC command field to the UE, where the TPC command field is corresponding to an index of the power offset term, or a TPC command field is corresponding to the power offset term and a TPC command.

Optionally, a format of the downlink control signaling is any one of downlink control information DCI formats used for uplink data transmission.

Optionally, the configuration module is specifically configured to send a power offset term to the UE.

Optionally, the network side device sends the power offset term to the UE by using higher layer signaling.

The network side device in this embodiment may be configured to perform the method in Embodiment 1. A specific implementation and a technical effect are similar to those in Embodiment 1. Details are not described herein again.

Figure 9:
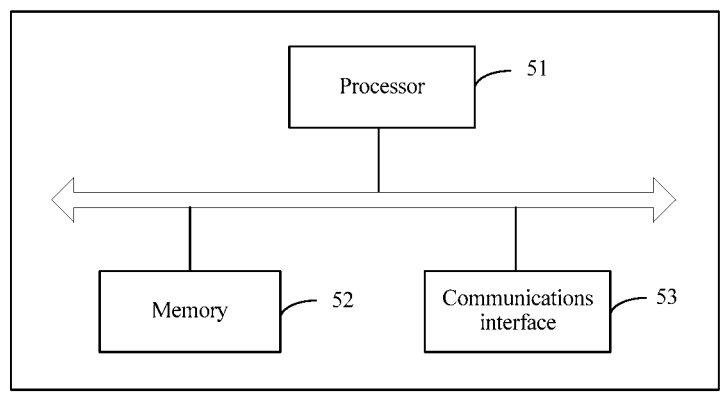
FIG. 9 is a schematic structural diagram of a UE according to an embodiment of the disclosure.

FIG. 9 is a schematic structural diagram of UE according to Embodiment 9. As shown in FIG. 9, the UE provided in this embodiment includes a processor 51, a memory 52, and a communications interface 53. The memory 52 and the communications interface 53 are connected to and communicate with the processor 51 by using a bus. The memory 52 is configured to store an instruction. The communications interface 53 is configured to communicate with another device. The processor 51 is configured to execute the instruction stored in the memory 52, so that the UE performs the method performed by the UE in the method provided in Embodiment 6. The communications interface 53 can be configured to: send data to a network side device, and receive data sent by the network side device, and the communications interface 53 may include a receiver and a transmitter.

Figure 10:
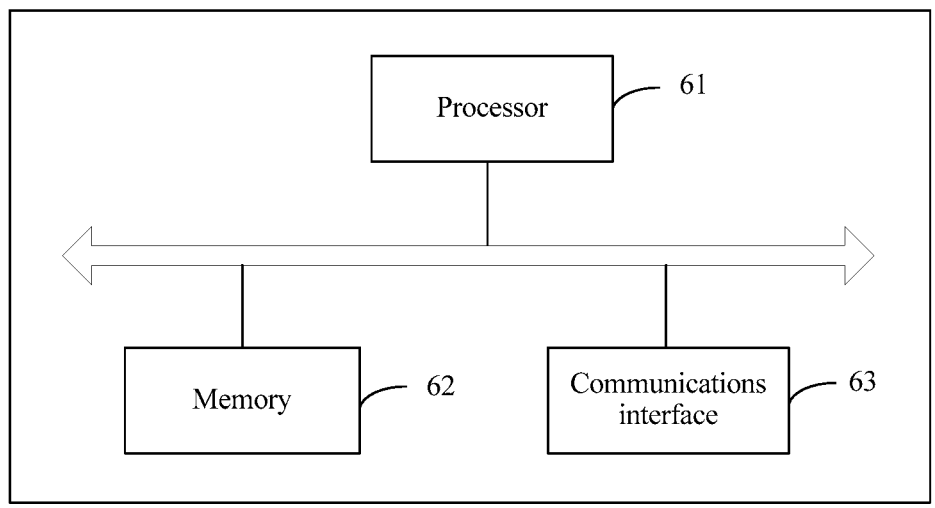
FIG. 10 is a schematic structural diagram of a network side device according to an embodiment of the disclosure.

FIG. 10 is a schematic structural diagram of a network side device according to Embodiment 10. As shown in FIG. 10, the network side device provided in this embodiment includes a processor 61, a memory 62, and a communications interface 63. The memory 62 and the communications interface 63 are connected to and communicate with the processor 61 by using a bus. The memory 62 is configured to store an instruction. The communications interface 63 is configured to communicate with another device. The processor 61 is configured to execute the instruction stored in the memory 62, so that the network side device performs the steps performed by the network side device in the method provided in Embodiment 6. The communications interface 63 can be configured to: send data to UE, and receive data sent by the UE, and the communications interface 63 may include a receiver and a transmitter.

It may be understood that, the processor used by the network side device or the UE in this application may be a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. It may implement or execute various example logical blocks, modules, and circuits that are described with reference to the content disclosed in this application. The processor may also be a combination of computing functions, for example, a combination of one or more microprocessors or a combination of a DSP and a microprocessor.

The bus described in this application may be an industry standard architecture (ISA) bus, a Peripheral Component Interconnect (PCI) bus, an extended industry standard architecture (EISA) bus, or the like. The bus may be categorized as an address bus, a data bus, a control bus, or the like. For ease of representation, the bus in the accompanying drawings of this application is not limited to only one bus or only one type of bus.

In the several embodiments provided in this application, it should be understood that the disclosed apparatus and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate. Parts displayed as units may or may not be physical units, in other words, may be located in one position, or may be distributed on a plurality of network units. Some or all of the units may be selected based on an actual requirement to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, a network device, or the like) or a processor to perform some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

What is claimed is:

1. An uplink power control method comprising:
receiving, by a user equipment (UE), an index of one of N power offset terms sent by the network side device, wherein the N is a positive integer greater than 1;
receiving, by the UE, at least one transmit power control (TPC) command field sent by the network side device, wherein the at least one TPC command field is corresponding to the index of one of N power offset terms;
determining, by the UE, a power offset term based on the index of one of N power offset terms and the at least one TPC command field; and
determining, by the UE, a transmit power of the uplink channel or the uplink signal based on the power offset term.

2. The method according to claim 1, wherein the index of one of N power offset terms and the at least one TPC command field is sent by the network side device to the UE by using downlink control signaling.

3. The method according to claim 2, wherein a format of the downlink control signaling is one of downlink control information (DCI) formats used for uplink data transmission or used for transmission of TPC commands.

4. The method according to claim 1, wherein the N is sent by the network side device to the UE by using higher layer signaling.

5. The method according to claim 1, wherein the power offset term is caused by a change in a transmit beam.

6. The method according to claim 1, wherein the uplink channel is an uplink traffic channel or an uplink control channel, and the uplink signal is an uplink reference signal.

7. A user equipment (UE) comprising:
a receiver, configured to:
receive an index of one of N power offset terms sent by the network side device, wherein the N is a positive integer greater than 1; and
receive at least one transmit power control (TPC) command field sent by the network side device, wherein the at least one TPC command field is corresponding to the index of one of N power offset terms; and
a processor, configured to:
determine a power offset term based on the index of one of N power offset terms and the at least one TPC command field; and
determine a transmit power of the uplink channel or the uplink signal based on the power offset term.

8. The UE according to claim 7, wherein the index of one of N power offset terms and the at least one TPC command field is sent by the network side device to the UE by using downlink control signaling.

9. The UE according to claim 8, wherein a format of the downlink control signaling is one of downlink control information (DCI) formats used for uplink data transmission or used for transmission of TPC commands.

10. The UE according to claim 7, wherein the N is sent by the network side device to the UE by using higher layer signaling.

11. The UE according to claim 7, wherein the power offset term is caused by a change in a transmit beam.

12. The UE according to claim 7, wherein the uplink channel is an uplink traffic channel or an uplink control channel, and the uplink signal is an uplink reference signal.

13. A non-transitory computer-readable storage medium having processor-executable instructions stored thereon, which when executed by a processor of a computer cause the computer to implement an uplink power control method comprising:
receiving, by a user equipment (UE), an index of one of N power offset terms sent by the network side device, wherein the N is a positive integer greater than 1;
receiving, by the UE, at least one transmit power control (TPC) command field sent by the network side device, wherein the at least one TPC command field is corresponding to the index of one of N power offset terms;
determining, by the UE, a power offset term based on the index of one of N power offset terms and the at least one TPC command field; and
determining, by the UE, a transmit power of the uplink channel or the uplink signal based on the power offset term.

14. The non-transitory computer-readable storage medium according to claim 13, wherein the index of one of N power offset terms and the at least one TPC command field is sent by the network side device to the UE by using downlink control signaling.

15. The non-transitory computer-readable storage medium according to claim 14, wherein a format of the downlink control signaling is one of downlink control information (DCI) formats used for uplink data transmission or used for transmission of TPC commands.

16. The non-transitory computer-readable storage medium according to claim 13, wherein the N is sent by the network side device to the UE by using higher layer signaling.

17. The non-transitory computer-readable storage medium according to claim 13, wherein the power offset term is caused by a change in a transmit beam.

18. The non-transitory computer-readable storage medium according to claim 13, wherein the uplink channel is an uplink traffic channel or an uplink control channel, and the uplink signal is an uplink reference signal.

* * * * *